US006206407B1

(12) United States Patent
Fuchs et al.

(10) Patent No.: US 6,206,407 B1
(45) Date of Patent: Mar. 27, 2001

(54) VEHICLE SUSPENSION SYSTEM

(75) Inventors: Daniel G. Fuchs, Tualatin, OR (US);
Paul R. Hynes, Vancouver, WA (US);
Frank S. Crow, Portland, OR (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 09/216,553

(22) Filed: Dec. 18, 1998

(51) Int. Cl.$^7$ ...................................................... B60G 5/00
(52) U.S. Cl. ..................................... 280/686; 280/124.174
(58) Field of Search ...................................... 280/686, 687, 280/680, 681, 124.116, 124.17, 124.174, 124.175, 124.165, 124.177; 267/262, 158, 36.1, 260, 269; 248/608, 674

(56) References Cited

U.S. PATENT DOCUMENTS

| | | |
|---|---|---|
| 1,587,509 | 6/1926 | Coutant . |
| 1,842,074 | 1/1932 | Davis . |
| 1,891,399 | 12/1932 | Ahlm et al. . |
| 1,913,698 | 6/1933 | Clement . |
| 1,926,274 | 6/1933 | Fageol . |
| 2,050,056 | 8/1936 | Kay . |
| 2,714,014 | 7/1955 | Frazier . |
| 2,750,201 | 6/1956 | Hagedorn . |
| 2,775,353 | 12/1956 | Tillou . |
| 3,149,855 | 9/1964 | Adloff . |
| 3,883,125 | 5/1975 | Takatsu . |
| 5,020,824 | 6/1991 | Mounier-Poulat et al. . |
| 5,524,921 | 6/1996 | Ellingsen . |

FOREIGN PATENT DOCUMENTS

| | | |
|---|---|---|
| 137096 | 4/1985 | (EP) . |
| 161155 | 11/1985 | (EP) . |
| 183599 | 6/1986 | (EP) . |
| 263388 | 4/1988 | (EP) . |
| 1158321 | 10/1956 | (FR) . |

OTHER PUBLICATIONS

Wallace G. Chalmers, "Rubber Springs," pub. No. 730,270 (publication date unknown, prior art publication).
Hendrickson Truck Suspension Systems, commercial publication advertising the HN 402 and HN 460 suspensions (1996).
Ridewell Corp., commercial publication advertising the Ridelastic 208S axle suspension (publication date unknown, prior art publication).

(List continued on next page.)

Primary Examiner—Brian L. Johnson
Assistant Examiner—Bryan Fischmann
(74) Attorney, Agent, or Firm—Klarquist Sparkman Campbell Leigh & Whinston LLP

(57) ABSTRACT

A vehicle suspension system is provided for coupling elongated frame rails to first and second axles, the axles extending in a direction transverse to the frame rails. Each axle has opposed outer end portions projecting outwardly beyond the frame rails. At each side of the vehicle, in proximity to the frame rail at the respective side of the vehicle, a vehicle suspension is provided which includes a leaf spring assembly comprised of one or more leaf springs. The leaf spring assembly has first and second end portions and a central portion. The leaf spring assembly extends from the outer end portion of the first axle to the outer end portion of the second axle. A bushing is coupled to the frame rail. The bushing includes at least three arcuate reinforcing plates with elastomeric material disposed between the plates. The leaf spring assembly is coupled to the bushing, most preferably by a clamp, to thereby couple the central portion of the leaf spring to the frame rail through the bushing. A first leaf spring mount couples the first end portion of the leaf spring assembly to the outer end portion of the first axle, and a second leaf spring mount couples the second end portion of the leaf spring assembly to the outer end portion of the second axle. The mounts move in shear relative to the axles and leaf spring assembly during relative articulation of the axles.

25 Claims, 8 Drawing Sheets

OTHER PUBLICATIONS

Rockwell International, commercial publication advertising the AC6S heavy duty suspension (Sep. 1990).

Volvo GM Heavy Truck Corp., commercial publication advertising T–Ride Bogies VBT4012R, VBT4018, VBT4618 (publication date unknown, prior art publication).

Chalmers Suspensions International Inc. advertisement and other documents (six sheets total) describing prior art Chalmer 800 Series rubber spring tandem truck suspension.

Mack Trucks, Inc. document entitled "Bogies and Axles" (dated 1992 and 1993).

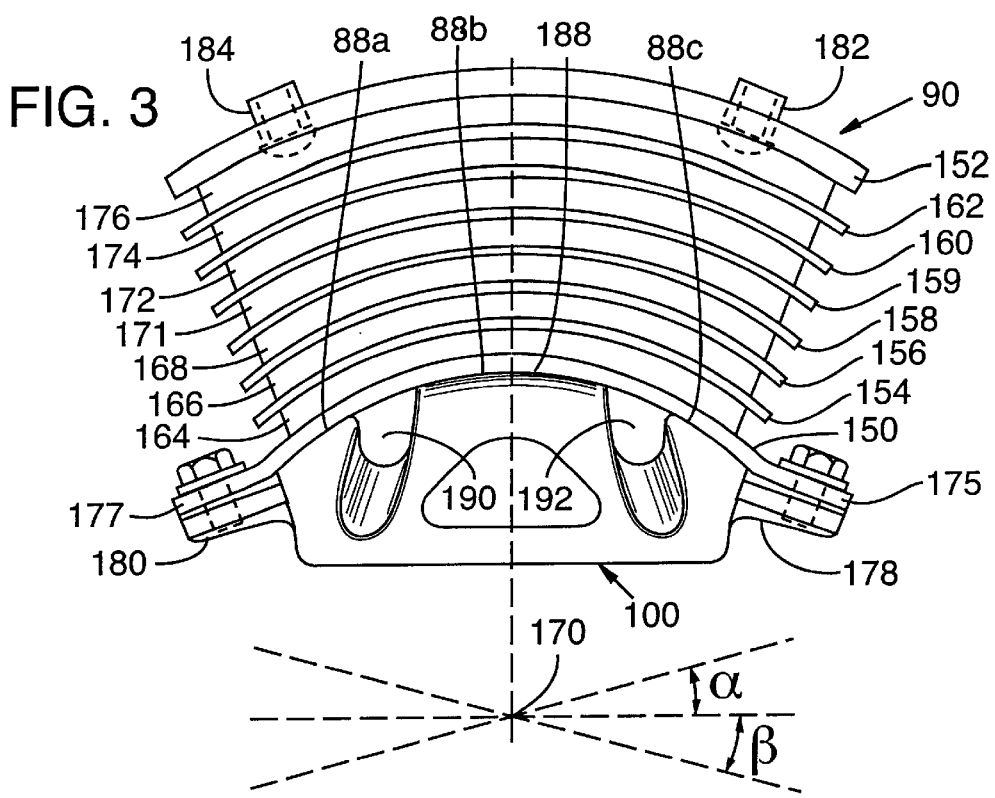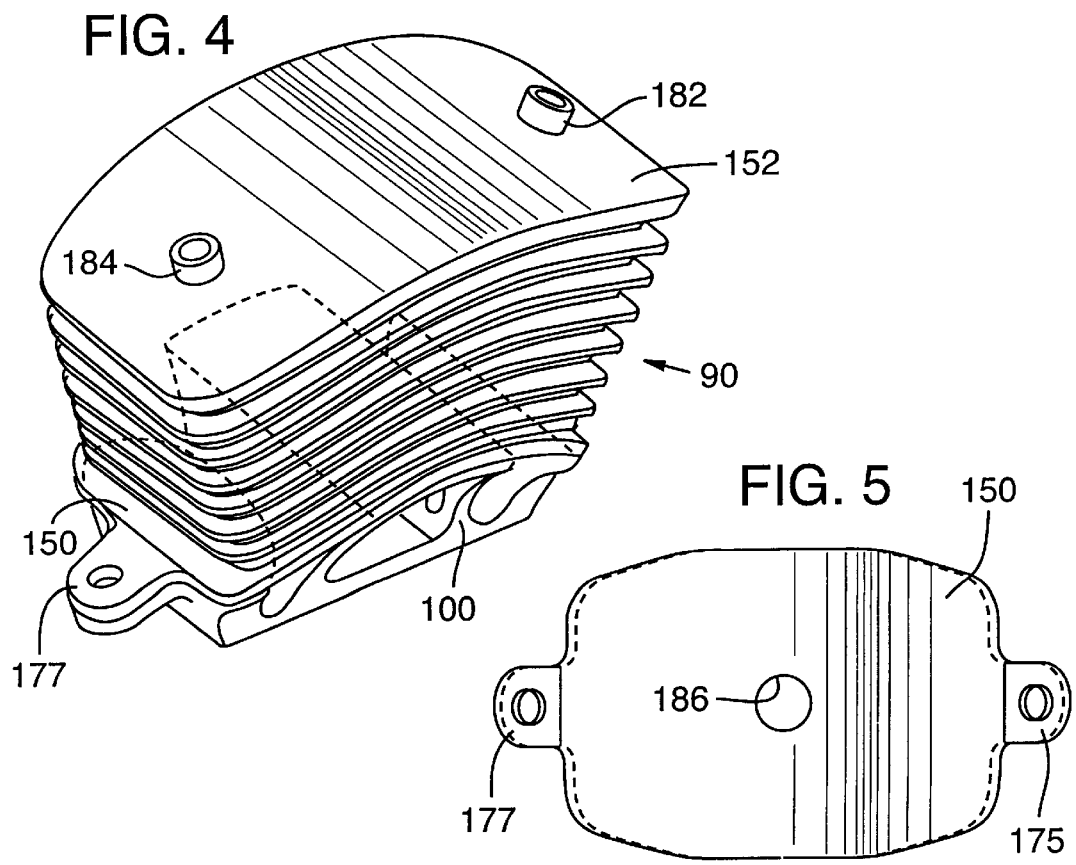

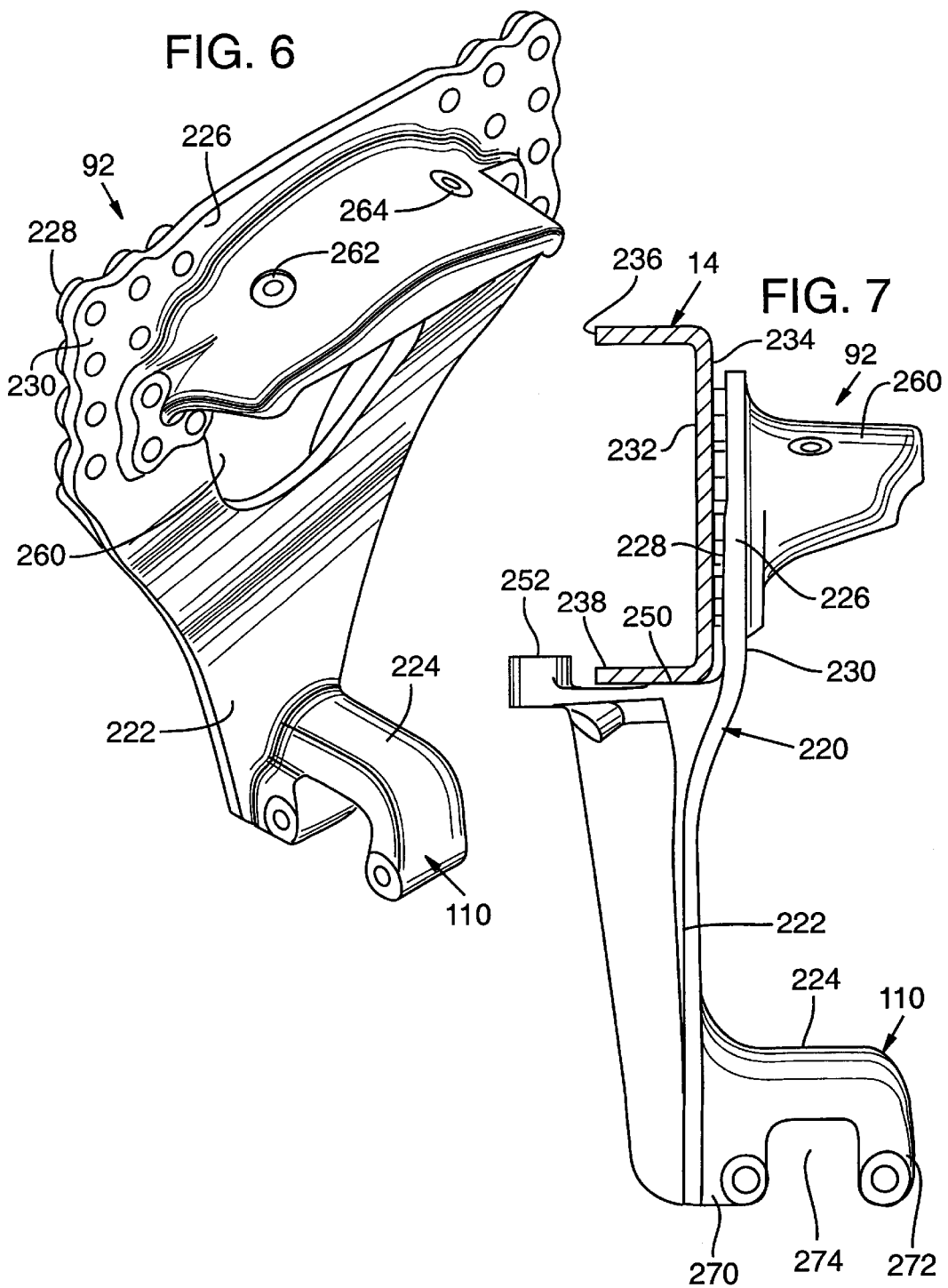

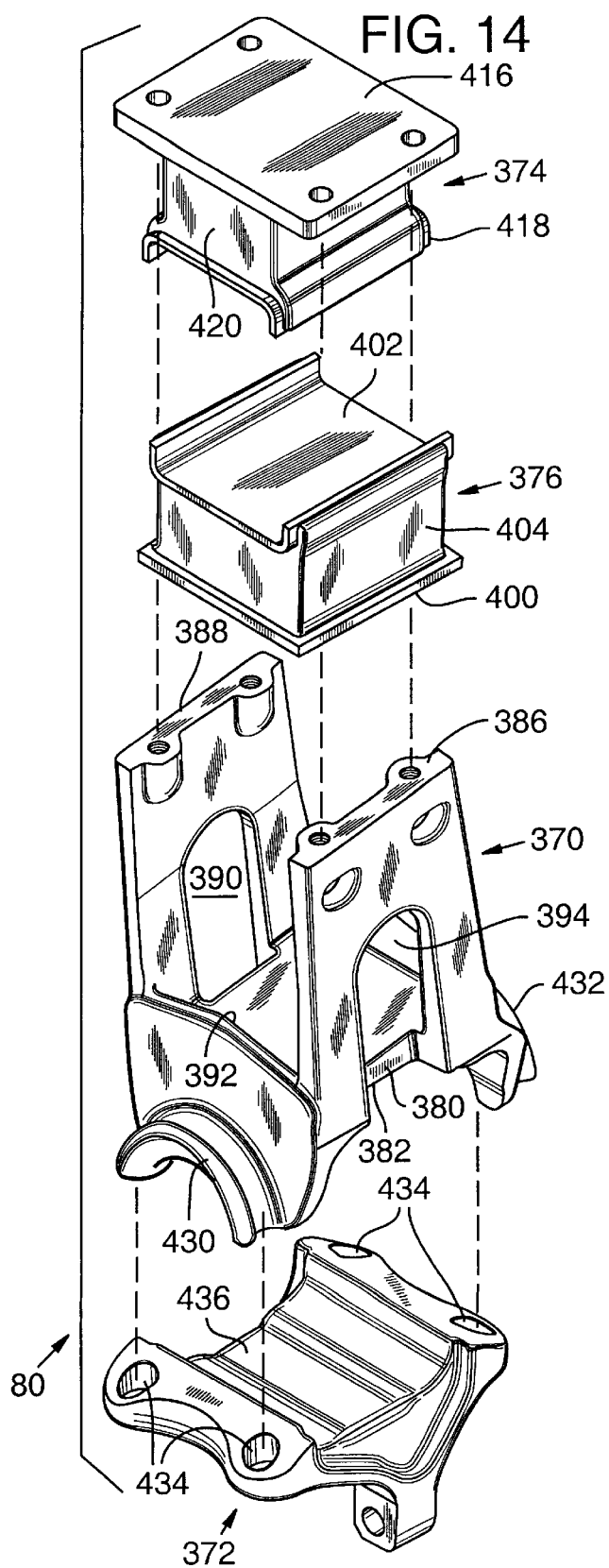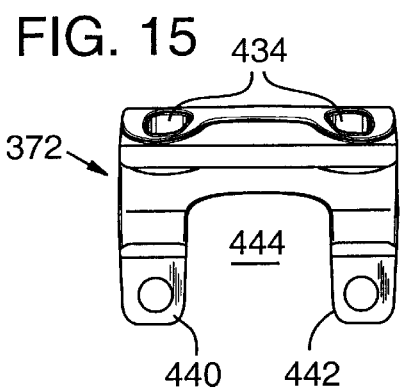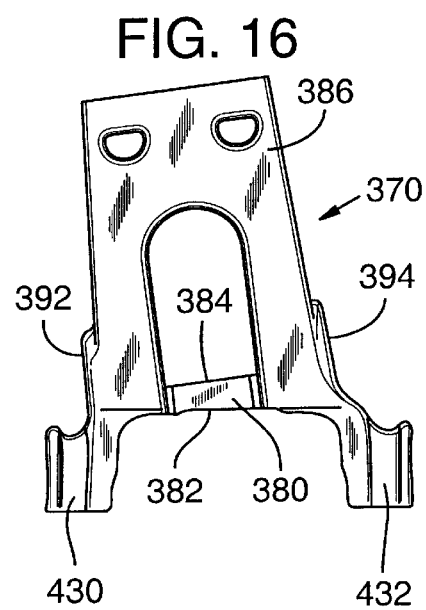

VEHICLE SUSPENSION SYSTEM

BACKGROUND

The present invention relates to vehicle suspension systems and, more specifically, to suspension systems for tandem axles which are particularly useful in rugged environments, such as at off-road construction sites.

Numerous suspension systems exist for supporting the weight of trucks together with the payload being carried by the truck.

A number of known designs utilize so-called walking beams, one on each side of a vehicle and positioned below the axles in combination with a cross-tube extending between the walking beams at a low point of the suspension. These designs suffer from a number of disadvantages, such as increased weight and low ground clearance.

Other designs utilize mechanically complex constructions which add to the expense of the designs.

In certain designs, to provide adequate clearance for the suspension system, the frame rails are supported at a relatively high elevation resulting in a vehicle with an increased ride height. This tends to adversely affect the stability of the vehicle.

In some known designs, it is difficult to replace components of the designs. In other designs, entire subassemblies must be replaced even though only a few components of the subassembly have worn out. This makes repairs more difficult and/or more expensive.

It is also often desirable in vehicles operated in rugged environments to provide reduced resistance to cross articulation and vertical articulation of the axles. Cross articulation is a condition where one axle is angled at one angle relative to horizontal, and the other axle is angled at an opposite angle relative to horizontal. Vertical articulation is where one axle is at a higher elevation than the other axle of the tandem pair.

The present invention relates to a vehicle suspension system and method which is directed toward overcoming these and other disadvantages of the prior art. The invention is not limited to a vehicle suspension system which overcomes all of the above disadvantages of known systems, as the present invention is directed toward overcoming one or more of the disadvantages of known systems.

SUMMARY

A vehicle suspension system is provided for coupling elongated frame rails to first and second axles, the axles extending in a direction transverse to the frame rails. Each axle has opposed outer end portions projecting outwardly beyond the frame rails. At each side of the vehicle, in proximity to the frame rail at the respective side of the vehicle, a vehicle suspension is provided which includes a leaf spring assembly comprised of one or more leaf springs and, most preferably, a plurality of leaf springs. The leaf spring assembly has first and second end portions and a central portion between the end portions. The leaf spring assembly extends from the outer end portion of the first axle to the outer end portion of the second axle. A bushing is coupled to the frame rail. The bushing includes at least three arcuate reinforcing plates with elastomeric material disposed between the plates. The leaf spring assembly is coupled to the bushing, most preferably by a clamp, to thereby couple a central portion of the leaf spring to the frame rail through the bushing. A first leaf spring mount couples the first end portion of the leaf spring assembly to the outer end portion of the first axle, and a second leaf spring mount couples the second end portion of the leaf spring assembly to the outer end portion of the second axle. In one specific form, these mounts are each designed to move in shear relative to the received leaf spring and portion as the axles articulate. More specifically, in an illustrated embodiment, the first and second leaf spring mounts may include shear pads receiving the leaf spring end portions therebetween. The shear pads move in shear during cross and vertical articulation of the axles.

The bushing is preferably at the elevation of the frame rail. In addition, the first end portion of the leaf spring assembly is preferably positioned above and overlays the outer end portion of the first axle, and the second end portion of the leaf spring assembly is preferably positioned above and overlays the outer end portion of the second axle. This provides a vehicle suspension system which permits a vehicle to be constructed with a low ride height while still providing significant clearance between the underside of the suspension system and the ground.

The bushing preferably has arcuate reinforcing plates each having an arc about a center which intersects a central portion of the leaf spring assembly. As a result, an efficient load transfer path is provided from the leaf springs through the bushings to the frame rails, while resistance to articulation of the axles by the suspension is reduced.

Upper and lower clamping elements may be positioned to apply a clamping force to an elongated section of the central portion of the leaf spring assembly, with the leaf spring assembly positioned between these clamping elements. In a specifically illustrated embodiment, U-bolts are used to interconnect the clamping elements to clamp the leaf spring assembly therebetween. These U-bolts each have a cross-piece or base which, in the illustrated embodiment, is positioned in a respective recess provided in the upper clamping element, with the legs of each U-bolt extending downwardly along the opposite side of the leaf spring assembly and through respective leg receiving apertures in the lower clamping element. In this embodiment, the lowermost arcuate plate of the bushing is mounted to the upper clamp element and captures the bases of the U-bolts in the recesses.

A specialized bushing mounting bracket may be used to couple the bushing to the frame rail. In an illustrated form, the bushing mounting bracket includes a rod supporting portion extending downwardly below the bushing and outwardly at a location below the leaf spring assembly. A first tie rod extends from the rod supporting portion of the bushing mounting bracket to the first leaf spring mount at the outer end portion of the first axle. A second tie rod extends from the rod supporting portion of the mounting bracket to the second leaf spring mount at the outer end portion of the second axle. In addition, the bushing mounting bracket has a body with an upper wall portion having an inner surface positioned adjacent to an outer surface of an upright web of the frame rail for coupling thereto to mount the bushing mounting bracket to the frame rail. An arcuate bushing engaging portion projects outwardly from the wall portion and away from the frame rail. This bushing engaging portion is positioned for coupling to an upper one of the arcuate reinforcing plates of the bushing. The bushing mounting bracket also includes a shelf positioned to lie beneath a lower flange portion of the frame rail. The shelf has an upwardly projecting lip spaced from the inner surface of the wall portion of the bushing mounting bracket. The lower flange portion of the rail, when the bushing mounting bracket is in place, is positioned adjacent to the shelf portion and between lip and inner surface of the wall portion. As a further aspect of the bushing mounting bracket, the rod supporting portion may include first and second downwardly projecting legs separated from one another by a void positioned therebetween. The first and second tie rods may each be mounted to the first and second legs, with the void providing clearance for the rods.

A stop may be mounted to the rod supporting portion of the bushing mounting brackets so as to project upwardly toward the underside of the leaf spring assembly. During normal loading of the vehicle suspension system, the stop is spaced from the underside of the leaf spring assembly. In contrast, if, for example, the rear end of the vehicle is raised for repair purposes, the stop limits the extent to which the suspension may drop downwardly, thereby protecting the bushing. In addition, respective stops may be provided on the frame rail for limiting the extent to which the outer end portions of the first and second axles may be raised relative to one another as the axles articulate. Consequently, articulation of the axles is freely permitted between limits established by the stops.

In a specific embodiment, the leaf spring mounts include replaceable pads which sandwich the leaf spring assembly therebetween. These pads move in shear with the received end portion of the leaf spring assembly positioned therebetween to facilitate articulation of the axles. In the event the pads become worn, they may be replaced without requiring replacement of other components of the leaf spring mounts. In addition, this construction provides a low profile mechanism for coupling the respective end portions of the leaf spring assemblies to their associated axles. For example, in a specific embodiment, the undersurface of the leaf spring assembly is positioned within about two inches of the upper surface of the axle.

In one specific form, the leaf spring mount includes an upper spring clamp member having first and second spaced-apart, upwardly extending spring retaining arms which define a spring receiving channel therebetween. The spring receiving channel extends through the upper spring clamp member in a direction generally parallel to the frame rail. A lower shear pad is positioned between the first and second spring retaining arms. The lower pad has a lower base, a lower channel defining element spaced from and positioned above the base and elastomeric material disposed between the lower channel defining element and the lower base. In addition, the mount includes an upper shear pad having an upper cap mounted to the spring retaining arms, the upper pad having an upper channel defining element spaced from and positioned below the upper cap and elastomeric material disposed between the upper cap and the upper channel defining element. The end portion of the leaf spring assembly is received between the upper and lower channel defining elements. When received in this manner, the shear pads are capable of moving in shear during articulation of the axles. In addition, in this case, the spring retaining arms confine this motion of the pads, although some twist motion as well as shear motion is permitted. In general, in this construction, the leaf spring assembly does not slide relative to the shear pads although relative sliding between these elements could be permitted to take place, for example, under extreme operating conditions. The upper caps engage stops on the frame rails to limit the cross articulation and vertical articulation of the axles. Also in this embodiment, the upper spring clamp may include a forwardly projecting first shoulder and a rearwardly projecting second shoulder. The leaf spring mount also may include a lower spring clamp member positioned below the associated axle. Fasteners, such as U-bolts, couple the respective first and second shoulders of the upper spring clamp member to the lower spring clamp member. The U-bolts have a base or crosspiece together with first and second legs projecting from the base. A base of each of these U-bolts is coupled to a respective one of the shoulders with the legs of the U-bolts extending through respective openings through the lower clamping element.

Although alternative constructions may be used, the leaf spring assembly most preferably comprises at least two leaf springs, preferably of metal such as spring steel. Each of the leaf springs has first and second end portions, with the leaf springs being stacked above one another when installed. In an illustrated embodiment, a first end portion of the lower leaf spring is narrowed in width and upwardly turned, with the leaf spring (or springs) above the lower leaf spring having an opening or notch through which the upwardly turned portion of the lower leaf spring extends. This construction minimizes the possible splaying of the outer ends of the leaf springs.

The present invention also relates to a method of suspending first and second axles from an elongated frame rail such that a leaf spring assembly is movable about a pivot axis that extends through the leaf spring assembly, the pivot axis being positioned below but in close proximity to the frame rail. The end portions of the leaf spring assembly are coupled to outer end portions of the axles with the coupling being capable of moving in shear relative to the leaf spring assembly during articulation of the axles. As another aspect of a method in accordance with the present invention, a central section of the leaf spring assembly is clamped to a bushing which includes a plurality of arcuate reinforcing plates with elastomeric material positioned between the plates, the plates having a common center point which coincides with the pivot axis. As a further aspect of the method, the bushing is mounted at the elevation of the frame rail.

These and other features and advantages of the present invention will become more apparent with reference to the drawings and description below. The present invention is not limited to an overall combination of all of the above features or to a system which incorporates or addresses all of the advantages mentioned above. The present invention relates to these features and advantages which are novel and non-obvious over known systems individually, as well as collectively.

BRIEF DESCRIPTION OF THE DRAWINGS

FIG. 3 is a side elevation view of one form of a bushing including at least three arcuate reinforcing plates, the illustrated form having eight such plates, with elastomeric material disposed between the plates.

FIG. 4 is a perspective view of the bushing of FIG. 3.

FIG. 5 is a top plan view of a lowermost arcuate plate included in the bushing of FIG. 3.

FIG. 6 is a perspective view of one form of a bushing mounting bracket for coupling the bushing of FIG. 3 to a vehicle frame rail.

FIG. 7 is a front elevation view of the bushing mounting bracket of FIG. 6.

FIG. 14 is an exploded view of the leaf spring mount of FIG. 13.

FIG. 15 is a front elevation view of the lowermost component of the leaf spring mount of FIG. 14.

FIG. 16 is a side elevation view of an upper spring clamp member for the mount of FIG. 14.

DETAILED DESCRIPTION

Figure 1:
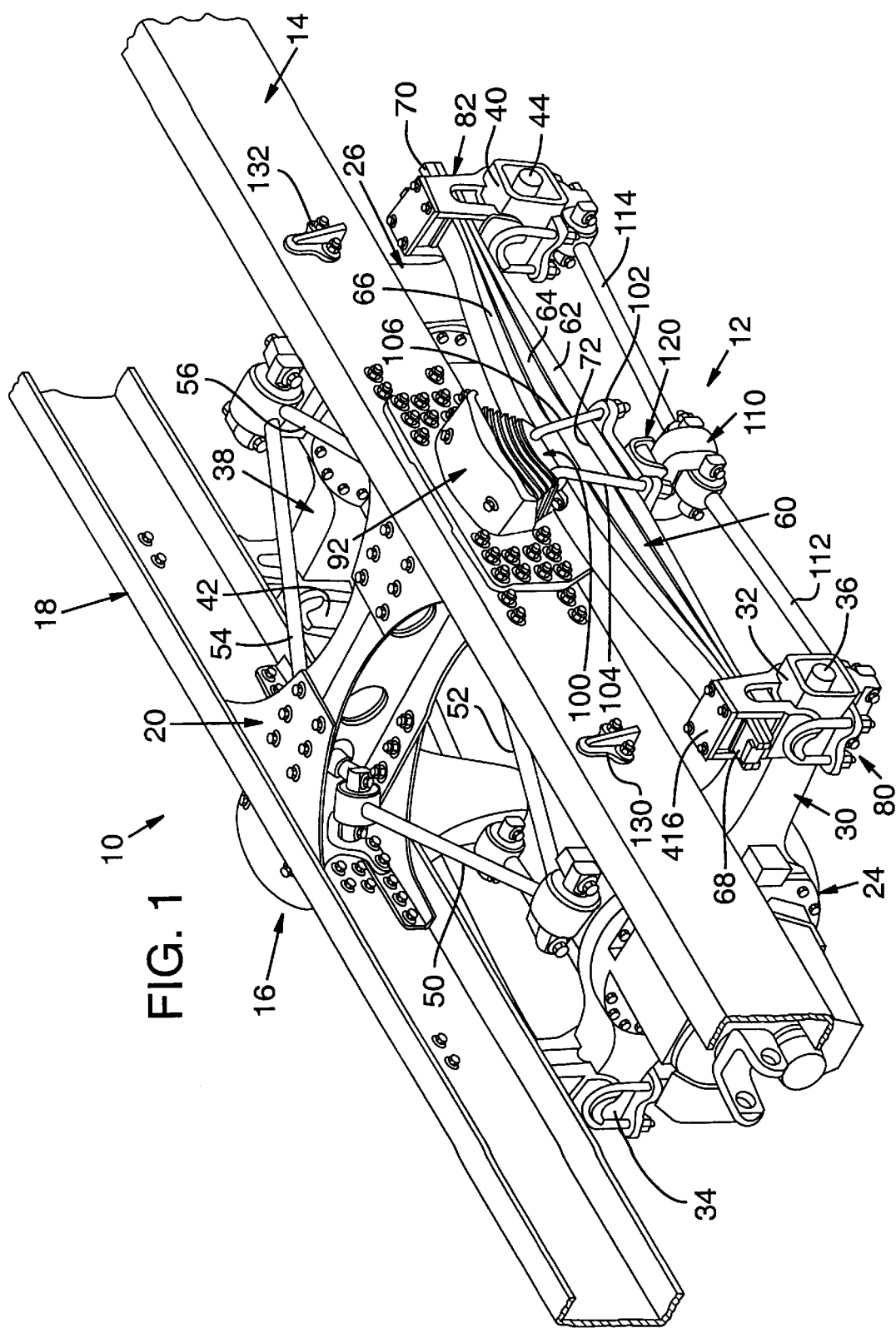
FIG. 1 is a perspective view of one embodiment of a vehicle suspension system in accordance with the present invention.
Figure 2:
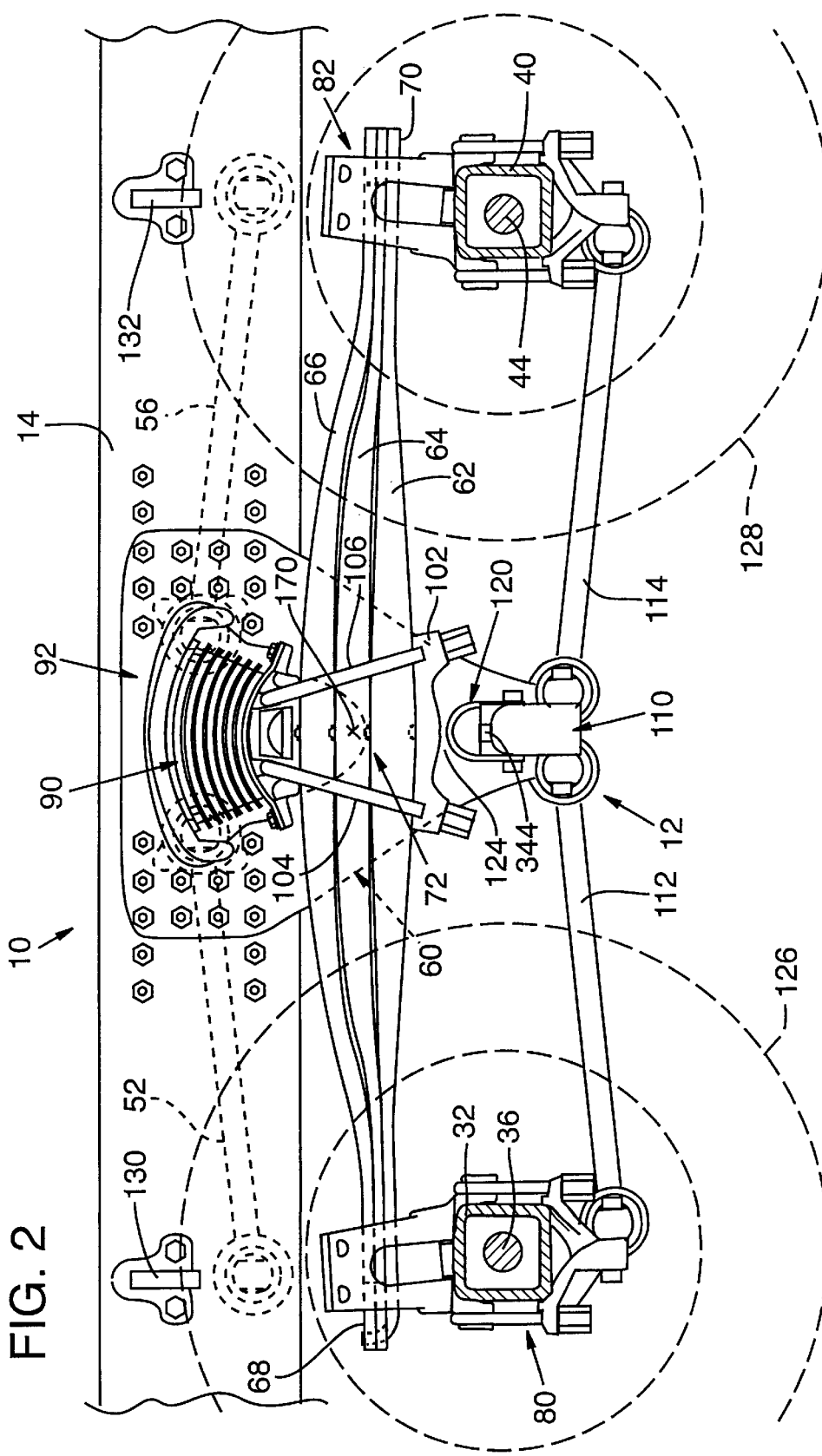
FIG. 2 is a side elevation view of the vehicle suspension system of FIG. 1.
Figure 8:
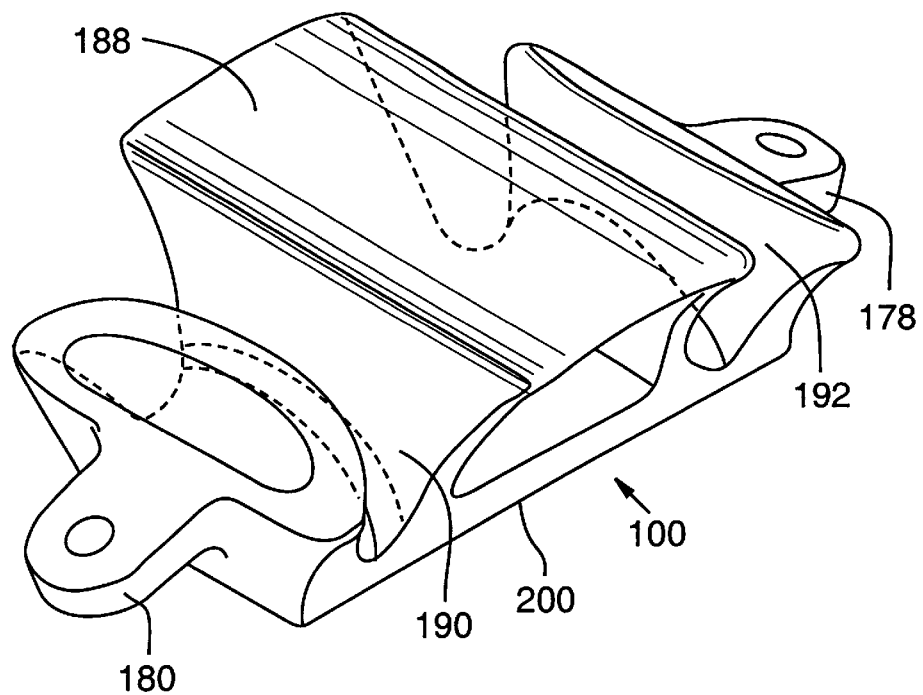
FIG. 8 is a perspective view of one form of an upper spring clamp member for clamping a section of a leaf spring assembly and also for coupling the leaf spring assembly to the bushing.
Figure 9:
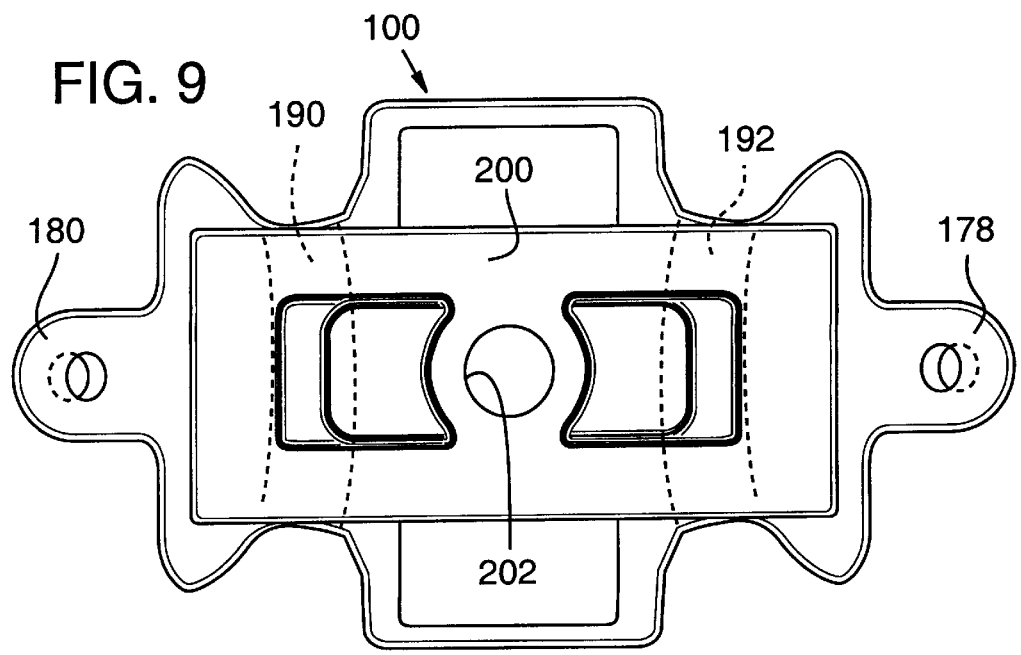
FIG. 9 is a bottom view of the clamp member of FIG. 8.

With reference to FIGS. 1 and 2, one embodiment of a vehicle suspension system 10, in accordance with the invention, is shown. The suspension system 10 includes a first vehicle suspension 12 coupled to a first frame rail 14 and a second vehicle suspension 16 coupled to a second frame rail 18. The frame rails 14, 18 are conventional and extend in a direction parallel to the longitudinal axis of a truck, with the two frame rails being spaced-apart from one another. A reinforcing cross member 20 extends between the frame rails 14, 18 at the location of the vehicle suspensions 12, 16.

The vehicle suspension 10 is designed to connect first and second axle assemblies 24, 26 to the frame rails. The axle assemblies 24, 26 shown in FIGS. 1 and 2 are combined in a tandem axle pair with each of the axles being driven, although the suspension system is not limited to use with driven axle assemblies. The axle assembly 24 includes an axle housing 30 with a first axle end portion 32 projecting outwardly beyond the frame rail 14, and an opposed axle end portion 34 projecting outwardly beyond the frame rail 18. A portion of a drive spindle 36 used in driving a wheel which is mounted to axle 32 is shown schematically in FIG. 1. Similarly, the axle assembly 26 includes an axle housing 38 having a first axle end portion 40 projecting outwardly beyond the frame rail 14, and a second axle end portion 42 projecting outwardly beyond the frame rail 18. A drive spindle 44 is shown schematically in FIG. 1 at the end of the axle end portion 40. A first set of tie rods 50, 52 couple the housing of axle assembly 24 to the respective end portions of the cross piece 20 and thus to the frame rails 14, 20. A similar set of tie rods 54, 56 couple the housing of axle assembly 26 to the cross piece 20 and frame rails. These tie rods are commercially available. As a specific example, the rods 50–56 may have elastomer in their respective ends. Suitable tie rods are available from Lemforder Metallwaren Elastmetall of Lemforder, Germany, or Tenneco of Milan, Ohio.

The vehicle suspensions 12, 16 are identical to one another and for this reason only the vehicle suspension 12 will be discussed in detail. In the embodiment shown in FIG. 1, the vehicle suspension 12 includes a leaf spring assembly 60 which includes at least one leaf spring, and most preferably includes a plurality of leaf springs, in this case three such leaf springs 62, 64 and 66. The leaf spring assembly includes a first end portion 68, a second end portion 70, and a central portion 72 between the end portions 68 and 70. Although the leaf spring assembly may be positioned at other locations, most preferably the leaf spring assembly is positioned at an elevation which is above the axle end portions 32, 40. Most specifically, in the illustrated construction the end portion 68 is positioned above and overlies the outwardly projecting end portion 32 of the axle 30. Similarly, the end portion 70 of the leaf spring assembly is positioned above and overlays the outer end portion 40 of the axle 38. A first leaf spring mount 80 couples the leaf spring end portion 68 to the axle end portion 32. A similar leaf spring mount 82 couples the leaf spring end portion 70 to the outer end portion 40 of the axle 38. Although other constructions may be used, the illustrated leaf spring mounts 80, 82 are particularly advantageous and are explained in greater detail, below.

The vehicle suspension 12 includes a bushing 90 coupled to the frame rail 14. As shown in FIG. 2 and described in greater detail below, the bushing 90 includes at least three arcuate reinforcing plates with elastomeric material disposed between the plates. This form of bushing provides minimal resistance to cross articulation and vertical articulation of the axles 30, 38. In the illustrated embodiment, a bushing mounting bracket 92 couples the bushing 90 to the frame rail 14. In addition, the central portion 72 of the leaf spring assembly is coupled to the bushing 90 to thereby couple the central portion of the leaf spring to the frame rail through the bushing. In the embodiment shown in FIGS. 1 and 2, a clamp applies a clamping force to the central portion 72 of the leaf spring assembly and connects the leaf spring assembly to the bushing. In the specific form illustrated in FIGS. 1 and 3, it being understood that other coupling mechanisms may be used, the central portion 72 of the leaf spring assembly 60 has an elongated section which is held between upper and lower clamp elements 100, 102. Suitable fasteners such as inverted U-bolts 104, 106 interconnect the two clamp elements 100, 102 to secure the clamping elements and leaf spring assembly together. In the case of U-bolt fasteners, these fasteners include a cross piece or base which extends through the clamping element 100 and respective legs which extend downwardly along the respective sides of the leaf springs 62, 64 and 66. The lower ends of these legs are inserted through openings provided in the lower clamp elements 102 where they are secured by, for example, nuts.

The bushing mounting bracket 92 shown in FIGS. 1 and 2, includes a downwardly and outwardly extending tie rod supporting portion 110 positioned below the leaf spring assembly. A first tie rod 112 extends from tie rod supporting portion 110 to the leaf spring mount 80. A second tie rod 114 extends from the tie rod supporting portion 110 to the leaf spring mount 82. Tie rods 112, 114 are commercially available, may include elastomer in their ends, and may be obtained from the same sources as the tie rods 50–56.

A stop or limit may be provided to limit the downward travel of the axles. As can be seen in FIG. 2, in one specific form a stop 120 may be mounted to the tie rod support portion 110 so as to project upwardly toward the undersurface of the leaf spring assembly 60. The stop 120 is preferably mounted with a gap 124 being provided between the undersurface of the lower clamp element 102 and the stop 120. Thus, in this case, a gap is provided between the stop and leaf spring assembly. If, for example, during repair, the vehicle frame rails are elevated to position the wheels 126, 128 (FIG. 2) off the ground, the stop 120 limits the extent to which the suspension travels downwardly. This protects the bushing 90 from over-extension and possible rupture. Other mechanisms may alternatively be provided for this purpose. In addition, the illustrated embodiment also includes limit mechanisms for limiting the maximum articulation of the respective axles. In the illustrated form, these limits are provided by first and second axle stops 130, 132 mounted to the exterior surface of the frame rail 14 and projecting outwardly from the frame rail. As the outer end portion 32 of axle 30 raises, the maximum extent to which it may be raised is limited by the stop 130. That is, the illustrated stop 130 engages a portion of the leaf spring mount 80 to limit the upward articulation of the axle at this location. Similarly, the maximum upward articulation of axle portion 40 is limited by stop 132. This stop 132 engages an upper portion of the leaf spring mount 82 when the upper limit of the maximum articulation of the axle portion 40 is reached.

In the illustrated embodiment, no transversely extending cross pieces are required below the frame rails 14, 18. Consequently, ground clearance is enhanced. Also, in the embodiment which is illustrated in FIGS. 1 and 2, the bushing 90 is positioned at the elevation of the frame rail. By this it is meant that preferably at least some of the bushing 90 is positioned above the lower surface of the frame rail 14. Most preferably, the majority of the bushing 90 is at an elevation which is above the lower surface of the frame rail and, in a specifically preferred design, the entire bushing 90 is located at an elevation between the upper and lowermost surfaces of the frame rail. Consequently, a more compact low riding vehicle suspension is provided. Also, by positioning the leaf spring assembly 60 above the axles 30, 38, the compactness of the assembly is enhanced and a more direct load transfer path is provided from the axles through the leaf spring assembly and bushing to the frame rails. At the same time, the use of a bushing comprised of a plurality of arcuate plates having elastomeric material disposed therebetween reduces the resistance to articulation by the suspension, thereby increasing the probability of the driven wheels maintaining contact with the ground during operation of the vehicle.

The illustrated form of the bushing 90 will be described in detail with reference to FIGS. 3, 4 and 5. As previously mentioned, the bushing 90 preferably includes at least three arcuate plates with elastomeric material disposed between these plates. Although the number of plates may be varied, in the form illustrated in FIG. 3, the bushing 90 includes a lower plate 150, an upper plate 152, and six intermediate plates 154, 156, 158, 159, 160 and 162. A first layer of elastomeric material 164 is disposed between plates 150, 154; a second layer of elastomeric material 166 is disposed between plates 154, 156; a third layer of elastomeric material 168 is disposed between plates 156, 158; a fourth layer of elastomeric material 170 is disposed between plates 158, 159; a fifth layer of elastomeric material 172 is disposed between plates 159, 160; a sixth layer of elastomeric material 174 is disposed between plates 162, 164; and a seventh layer of elastomeric material 176 is disposed between plates 162 and 162. Although the layers may be comprised of different elastomeric materials, for example, of materials of different durometers, and less preferably some of the layers may be of non-elastomeric materials (providing there are at least three arcuate plates with elastomeric material between said at least three plates or material with equivalent properties which, for purposes of this description, will be deemed elastomeric material), most preferably the layers 164 through 176 are of a common material. This makes the bushing 90 relatively easy to manufacture. For example, the plates 150 through 162 may be positioned in a mold and held at their desired locations. The elastomeric material may be melted and caused to flow into the space between the plates, thereby bonding the plates together. By making the elastomeric layers of the same material, this molding process is facilitated. Most preferably, in one example, the elastomeric material is a natural rubber with a durometer of 68 on the Shore A Scale. Goodyear Tire and Rubber Company is one source of this material. In addition, the layers 164 through 176 may be of different thicknesses. The thickness of the layers may vary with about 4–10 mm being exemplary thicknesses. In one specific embodiment, the respective layers have the following thicknesses (although, again, this may be varied):

Layer 164 5.8 mm
Layer 166 5.1 mm
Layer 168 5.0 mm
Layer 171 5.0 mm
Layer 172 5.0 mm
Layer 174 4.6 mm
Layer 176 4.2 mm The plates 150 through 162 and 152 are most preferably made of a durable rigid material such as of high strength low alloy (HSLA) steel. Although this may be varied, the illustrated intermediate plates 154 through 162 have a common thickness, with 10 ga (0.1345 inch) being a specific example. In contrast, the plate 150 is typically 0.375 inch thick, and the plate 152 is typically 0.375 inch thick. The plates 150 through 162, as can be seen in FIGS. 1 and 3, are downwardly curved. Most preferably, the plates each are an arc of a respective circle with the circles having a common center point indicated at 170 in FIG. 3. The point 170 is also indicated in FIG. 2. This center point corresponds to the pivot axis about which the suspension system tends to pivot. Most preferably, the pivot axis, which extends in a transverse direction relative to the frame rails and in a direction perpendicular to the frame rails, passes through the leaf spring assembly and may pass through the center of the centermost leaf spring 64 of the leaf spring assembly. In addition, the articulation of the axles between the limits established by the stops 130, 132 are indicated by the angles α and β in FIG. 3. In the illustrated embodiment, although the articulation may be varied, α and β are the same and are established at fifteen degrees. Although this may be varied, the maximum moment at point A to obtain a fifteen degree articulation is preferably no more than 26,000 inch-pounds based on a load of 1000 pounds at an axle which is twenty-six inches from point A. The most preferred resisting moment is zero.

The lowermost plate 150 is shown in FIG. 5 and has a pair of projecting ears 175, 177 each with an opening therethrough. As can be seen in FIG. 3, the lower clamping element 102 is provided with respective ears 178, 180 with threaded openings therethrough which are aligned with the openings through the ears 175, 177. Consequently, the bushing 90 may be bolted to the clamp element 100 in a convenient manner, although other clamp to bushing coupling approaches may be used. Also, as can be seen in FIGS. 3 and 4, fastener receivers 182, 184, which may be threaded, pass upwardly through openings in the upper plate 152. These fastener receivers 182, 184 have enlarged heads to prevent them from pulling through the plate 152. Elements 182, 184 are used in mounting the bushing 90 to the bushing mounting bracket 92 (FIG. 1).

The plates 150 through 162 may have openings (see, for example opening 186 in FIG. 5) through which the elastomeric material may flow during manufacture to more effectively bond these plates together. Alternatively, these openings may be eliminated.

Figure 10:
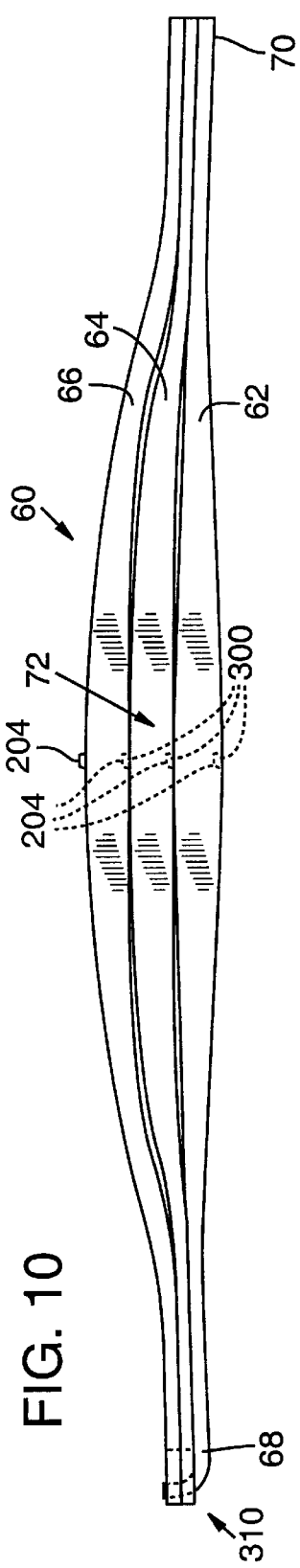
FIG. 10 is a side elevation view of one form of a leaf spring assembly used in the embodiment of FIG. 1.

With reference to FIGS. 1, 3, 8 and 9, the upper clamping element 100 includes an upper surface 188 with sections 188a, 188b and 188c which are curved to match the contour of the undersurface of the plate 150 to provide solid support for this plate. In addition, respective fastener receiving recesses 190, 192 extend downwardly from the surface 188 into the body of the upper clamping member 100. The inverted U-bolts 104, 106 have cross pieces which are positioned in the respective recesses 190, 192. When positioned in this manner and when the bushing 90 is mounted to the clamping element 100, the plate 150 assists in retaining the bolts 104, 106 in place in the suspension assembly. With references to FIGS. 8 and 9, the clamping element 100 includes a leaf spring engaging surface 200 which in the illustrated form has a majority of its surface in a common horizontal plane. The illustrated leaf spring engaging surface bears against and applies a clamping force to at least one elongated section of the leaf spring assembly (see FIG. 1). In addition, a central recess 202 extends upwardly into the surface 200 of clamping element 100. Recess 202 receives an upwardly extending projection 204 (FIG. 10) from the uppermost leaf spring 66 of the leaf spring assembly to assist in locking the leaf springs against transverse sliding movement during operation of the suspension. This optional feature is preferred, although the U-bolts or other fasteners may be used to maintain the leaf springs in stacked alignment with one another. For example, a through bolt may be used with recess 202 receiving the head or fastening nut for such a bolt.

With reference to FIGS. 1, 6 and 7, a specific form of bushing mounting bracket 92 is shown. It is to be understood that, although this form of mounting bracket 92 provides a number of advantages, the bushing 90 may be mounted to the frame rail 14 in other ways while still providing an advantageous vehicle suspension. The illustrated bushing mounting bracket 92 includes a body 220 with a rod supporting portion 110, in this case comprised of a downwardly projecting arm 222, and an outwardly projecting tie rod engaging member 224. In addition, the body 220 includes an upper wall portion 226 having respective interior and exterior wall surfaces 228, 230. The illustrated frame rail 14 is generally C-shaped in cross-section with an upright web portion 232 having an exterior surface 234. The frame rail 14 also has upper and lower flange portions 236, 238 projecting inwardly and away from the exterior or outer surface 234 of the frame rail web 232. In the illustrated construction, the interior surface 228 of wall portion 226 abuts the outer surface 234 of the web 232. Fasteners (see FIG. 1) extend through openings in bushing mounting bracket 92 and the web 232 of frame rail 14 for mounting the bracket 92 to the web.

The body 220 of the bracket 92 shown in FIGS. 6 and 7 may also include a shelf portion 250 which supports the lower surface of the lower flange 238 and an upwardly projecting lip portion 252 spaced from the wall portion 226. The lower flange 238 of the frame rail 14 is positioned adjacent to the shelf portion and between the lip 252 and inner surface 228 of the wall portion 226. More specifically, in the illustrated construction, the flange 238 abuts the shelf portion 250. Consequently, when mounted in place, the bracket 92 is rigidly coupled to the frame rail.

The illustrated form of mounting bracket 92 also includes a bushing engaging flange 260 projecting outwardly from the wall portion 226. Most preferably, flange bushing engaging 260 is of an arcuate configuration having an under surface which corresponds to the contour of the upper surface of the bushing plate 152 (FIG. 3). In addition, openings 262, 264 are provided through bushing engaging flange 260 in alignment with the fastener receivers 184, 182 (FIG. 3) for use in securing the bushing to the bracket 92, such as by bolts or other fasteners. Most preferably, the bracket 92 is of one-piece construction. For example, the bracket 92 may be cast or molded of a durable rigid material, such as austempered ductile iron.

As best seen in FIG. 7, tie rod engaging member 224 of the bracket 92 is spaced-apart from and positioned below the flange 260. Tie rod engaging member 224 includes first and second downwardly projecting legs 270, 272 separated by a void 274 positioned therebetween. The void extends generally in a direction parallel to the frame rail. As can be best seen in FIG. 1, the respective tie rods 112, 114 are each mounted to the first and second legs 270, 272 with the void 274 providing clearance for the tie rods.

Figure 11:
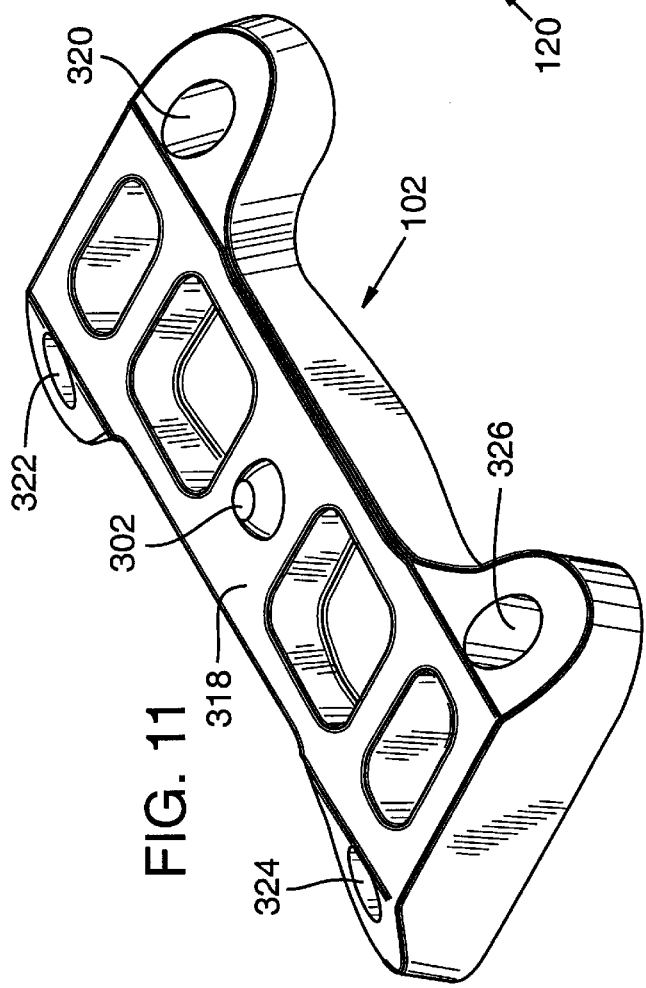
FIG. 11 is a perspective view of a lower spring clamp element which, together with the clamp member of FIG. 8, is used for coupling the leaf spring assembly of FIG. 10 to the bushing of FIG. 3.

Referring again to FIG. 10, the leaf spring assembly 60 is shown in greater detail and is illustrated in this figure as if loaded at its rated load (e.g. 21,000 pounds for a 46,000 pound leaf spring assembly, and 23,000 pounds for 52,000 pound leaf spring assembly). Although variable, in the illustrated embodiment, the maximum spring load is two times the rated load. The spring rate of the leaf spring assemblies is also variable. In a specific embodiment, for a 46,000 pound leaf spring assembly, a spring rate of 21,072 pounds per inch was selected, and for a 52,000 pound leaf spring assembly, a spring rate of 23,056 pounds per inch was selected. The spring deflection from free to laden in both cases was selected to be about one inch (0.997 inch). The upper surface of each of the leaf springs 62, 64, 66 is provided with an upwardly extending projection 204 (FIG. 10), while the under surface of each of the leaf springs is provided with a recess 300 designed to receive a projection from below. In the case of the recess 300 in the lowermost leaf 62 of the leaf spring assembly, this recess receives a projection 302 extending upwardly from the lower clamping element 102 (FIG. 11). These projections assist in maintaining the leaf springs in stacked alignment. Alternatively, the leaf springs may be maintained in a stacked arrangement without interlocking connectors or other fasteners, such as a through bolt, may be used for this purpose. In this case, projection 302 is typically replaced with a bolt head or nut receiving recess.

Figure 13:
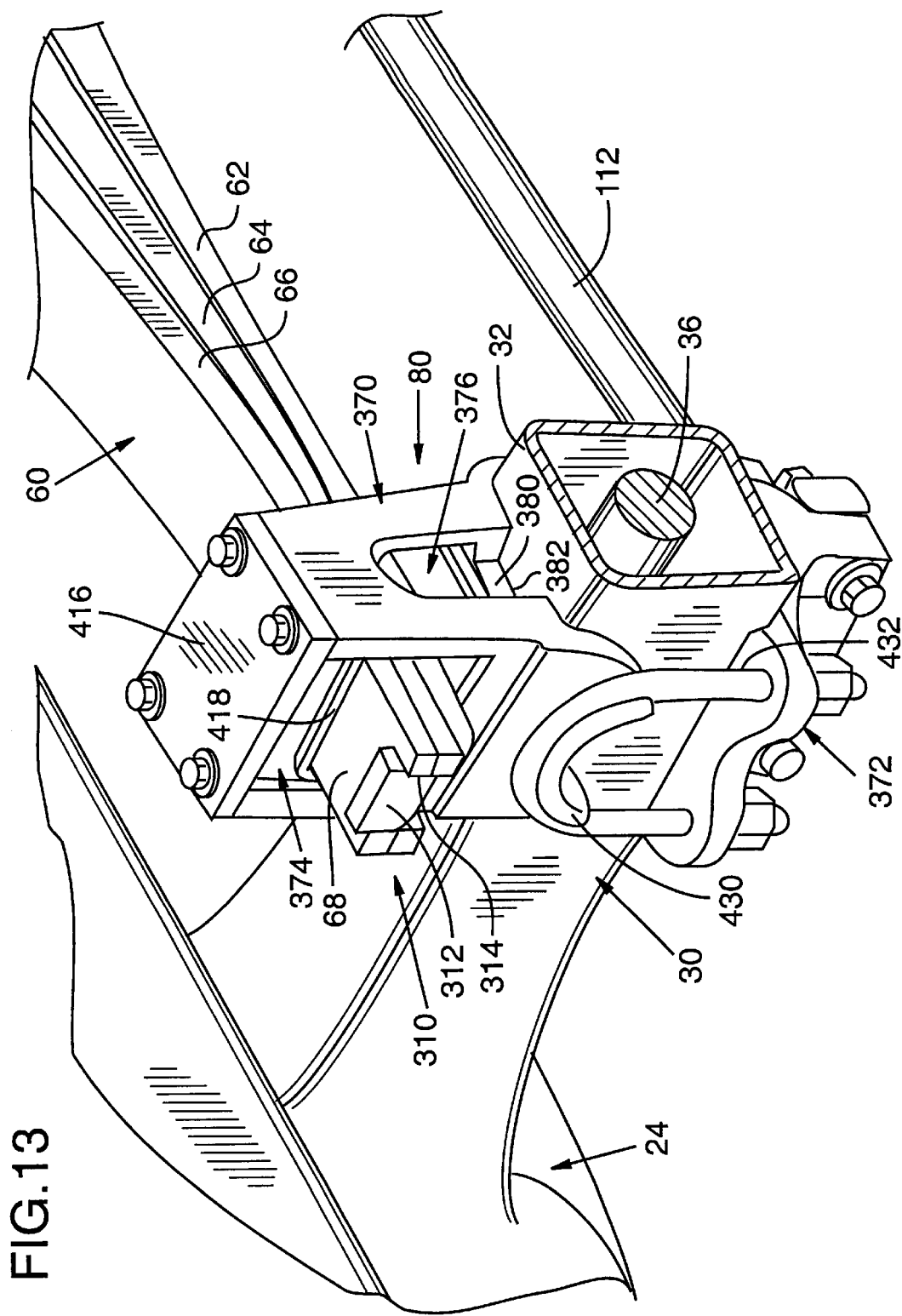
FIG. 13 is a perspective view of one form of a leaf spring mount used to couple an end portion of the leaf spring assembly of FIG. 1 to an associated axle.

As best seen in FIG. 13, an optional anti-splaying mechanism is included in the leaf spring assembly. This mechanism may be included at both of the end portions 68, 70 of the leaf spring assembly. However, in the illustrated embodiment, the anti-splaying mechanism is included only at the end 68 and is designated by the number 310. In an illustrated form, and end portion of one of the leaf springs is turned to extend into engagement with the end portions of the other leaf springs. More specifically, in accordance with a specifically illustrated embodiment, the outermost end 312 of the lower leaf spring 62 is narrowed in width and is turned upwardly at the end of the leaf spring assembly. In addition, the leaf springs above the lowermost leaf spring 62 are provided with an opening (in this case, a notch 314) through which the upturned end 312 of leaf spring 62 extends. The portions of the leaf springs 64, 66 bounding the notch 314 engage the side edges of the upturned portion of the leaf spring 312, thereby locking the ends of the leaf springs together so that splaying or sideways separation of the leaf spring ends is eliminated.

With reference to FIG. 11, the illustrated lower spring assembly clamp element 102 has an upper surface 318 which, apart from projection 302, is a generally flat or planar spring engaging surface. The illustrated surface 318 engages at least one elongated portion of the under-surface of leaf spring 62 when the suspension system is assembled. Clamping element 102 has two sets of openings 320, 322, and 324, 326 for receiving the legs of the respective U-bolts 104, 106 (FIG. 1).

Figure 12:
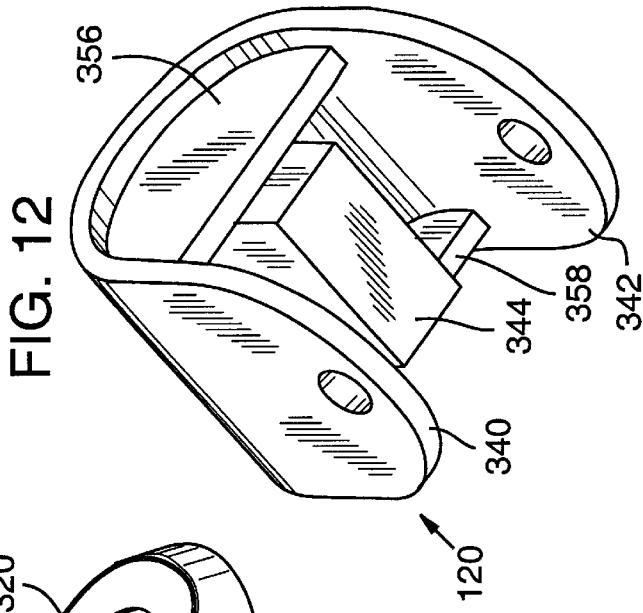
FIG. 12 is a perspective view of one form of a stop utilized in the embodiment of FIG. 1 for limiting the downward travel of the vehicle suspension in the event the load on both axles is relieved.

One form of stop 120 mounted to the rod supporting portion 110 of the bracket 92 (see FIG. 1) is shown in greater detail in FIG. 12. This specific stop includes first and second downwardly extending ears 340, 342 which receive a section of the rod supporting portion 110 of bracket 92 (FIG. 1) therebetween. Openings are provided in stop 120 through the respective ears 340, 342 for use in receiving fasteners which secure the stop to bracket portion 110. A pad 344, such as of steel, is positioned between the ears 340, 342, and also between walls 356, 358 of the stop 120. The pad 344 engages the upper surface of the tie rod supporting portion 110 of bracket 92 (see FIG. 2).

With reference to FIGS. 13 through 16, a leaf spring mount 80 of the specifically illustrated form for coupling the first end portion 68 of the leaf spring assembly to the axle 32 will next be described. The illustrated form of leaf spring mount 80 is designed to move in shear relative to the coupled leaf spring assembly as the axles articulate. More specifically, the leaf spring mount includes shear elements, such as shear pads, positioned both above and below the leaf spring end portion to permit motion in shear of the mount relative to the leaf spring at locations both above and below the leaf spring. For manufacturing convenience, each of the leaf spring mounts utilized in the vehicle suspension system of the illustrated embodiment are preferably of identical construction. Moreover, the illustrated components making up these elements are interchangeable, thereby minimizing the required inventory of replacement parts. The illustrated leaf spring mount 80 includes upper and lower spring clamp members 370, 372 which are designed for rigid mounting to the axle end portion 32, and more specifically to a rectangular section of this axle end portion. In addition, the leaf spring mount also includes upper and lower spring leaf engaging elements 374, 376 which preferably take the form of shear pads. Elements 374, 376 bear against the respective upper surface of leaf spring 66 and lower surface of leaf spring 62 at the end portion 68 of the leaf spring assembly 60. The elements 370, 372 are typically cast of a durable material such as austempered ductile iron.

The upper spring clamp member 370 includes a base 380 having an under surface 382 which rests on the upper surface of the axle 32. As best seen in FIG. 16, the upper surface 384 of the illustrated base is inclined. The illustrated upper spring clamp member 370 (see FIG. 14) includes first and second spaced-apart upwardly extending spring retaining arms 386, 388 which define a spring receiving channel 390 therebetween. The channel 390 extends between the arms in a direction generally parallel to the frame rail when the member 370 is mounted to the axle. Consequently, the arms generally constrain the shear motion of pads 404, 420 (discussed below) of elements 374, 376 with most of the motion being in directions parallel to the arms 386, 388. Cross walls 392, 394 extend between the arms 386, 388 at the lower front and rear edge portions of these arms. The illustrated member 376 comprises a lower shear pad having a lower base 400, a leaf spring channel defining element 402 positioned above and spaced from the lower base 400 and a pad 404, such as of an elastomeric material positioned between the base 400 and element 402. Any suitable material may be used for the pad 404, although the material is preferably resilient, with natural rubber of a durometer of 68 on the Shore A scale being a specific example. The channel defining element 402 is, for example, of high strength low alloy (HSLA) steel. These materials may be varied. The channel defined by the element 402 also extends in a direction which is generally parallel to the frame rail 14 when the spring mount is positioned on the axle 32. The illustrated element 374 also comprises an upper shear pad having an upper cap 416, a lower channel defining element 418, and a pad 420, such as of an elastomeric material, positioned between the elements 416 and 418. Pad 420 may be of the same material as the material used in the pad 404. The channel defined by element 418 also extends in a direction generally parallel to the frame rail 14 when the mount is positioned in place. When assembled, the end portion 68 of the leaf spring assembly 60 (see FIG. 13) is positioned between the channel defining elements 402, 418 of the respective elements 376, 374. With this construction, the shear pads 404, 420 move in shear during articulation of the axles with the leaf spring assembly remaining generally at a fixed location relative to channel elements 402, 418. In addition, the upper cap 416 is typically of steel or other durable material and is positioned at an elevation to engage the stop 130 (FIG. 1) and limit the maximum upward articulation of the axle 30.

The FIG. 14 form of upper spring clamp member 370 includes respective forwardly (relative to the front of the vehicle) and rearwardly extending shoulders 430, 432. As can be seen in FIG. 13, the shoulder 430 is engaged by a cross-piece portion of an inverted U-bolt 432 with the legs of the U-bolt being inserted through respective openings 434 provided in the lower spring clamp element 372. The spring clamp member 372 has an upper surface 436 positioned to engage the under surface of the axle end portion 32 when the spring mount 80 is in place. As best seen in FIG. 15, lower spring clamp member 372 includes a pair of downwardly extending legs 440, 442 separated by a void 444. The end of the tie rod 112 is mounted to the legs 440, 442, as by bolts, with the void 444 providing clearance space for the tie rod.

In operation, the vehicle suspension system of the present invention enhances desirable cross articulation of the axles as well as vertical articulation of the respective axles. That is, assume the wheels attached to axle 30 at both sides of the vehicle drop into a depression with the axle housing 30 remaining in a horizontal plane. Also, assume the wheels mounted to axle housing 38 encounter an elevated bump while the axle 38 is horizontal. In this example, vertical articulation of the two axles takes place, with the front axle being down or at a lower elevation than the rear axle. Under these circumstances, the bushings 90 at each side of the vehicle permit the leaf spring assemblies 72 to pivot about the pivot axis 170 (FIG. 2) so that the forward end portion 68 of the leaf spring assembly 60 tilts downwardly relative to the rear end portion 70 of the leaf spring assembly. In addition, because of the low resistance to pivoting provided by bushing 90, the wheels readily track the terrain so as to enhance the traction between the wheels and the terrain even though the terrain has shifted. In one specific embodiment of the invention, during vertical articulation, the lowest axle can move downwardly (from a plane containing both axles when operated on level terrain) a distance of about six inches or more, while the upper axle can move upwardly relative to this plane about six inches or more.

Assume operating conditions where cross articulation of the axles is maximized. For example, assume the wheels mounted to axle housing 30 at the driver's side of the vehicle drop into a hole while the wheels on axle housing 30 at the passenger side of the vehicle are elevated by a bump. In addition, at the same time, assume the wheels attached to the rear axle housing 38 at the driver's side of the vehicle are elevated by a bump while the wheels at the passenger side of the vehicle attached to the rear axle housing 38 drop into a depression. Under these conditions, the front axle is pivoted in one direction relative to horizontal while the rear axle is pivoted in the opposite direction relative to horizontal. The vehicle suspension system of the present invention facilitates this cross articulation. In one specific example, a vehicle suspension system like that in FIG. 1 permitted thirteen inch relative axle articulation (e.g. the rear axle moving upwardly about 10.4 degrees relative to horizontal, and the front axle moving downwardly about 10.4 degrees relative to horizontal). As a result, the suspension system is extremely useful, particularly in applications where the vehicle is operated on rugged terrain.

Having illustrated and described the principals of our invention with respect to several embodiments, it should be apparent to those of ordinary skill in the art that the invention may be modified in arrangement and detail without departing from such principals. We claim all such modifications which fall within the spirit and scope of the following claims.

What is claimed is:

1. A vehicle suspension for coupling an elongated frame rail to first and second axles, the axles extending in a direction transverse to the frame rail and each having an outer end portion projecting outwardly beyond the frame rail, the vehicle suspension comprising:
   a leaf spring assembly having first and second end portions and a central portion between the end portions, the leaf spring assembly extending from the outer end portion of the first axle to the outer end portion of the second axle;
   a bushing coupled to the frame rail, the bushing including at least three arcuate reinforcing plates with elastomeric material disposed between the plates;
   a clamp coupling the central portion of the leaf spring assembly to the bushing such that the central portion of the leaf spring is coupled to the frame rail through the bushing and such that the clamp restricts the clamped portion of the leaf spring from bending; and
   a first leaf spring mount coupling the first end portion of the leaf spring assembly to the outer end portion of the first axle and a second leaf spring mount coupling the second end portion of the leaf spring assembly to the outer end portion of the second axle, the first and second leaf spring mounts including shear elements positioned above and below the coupled end portion of the leaf spring and which move in shear relative to the axles and leaf spring assembly as the axles articulate relative to one another.

2. A vehicle suspension according to claim 1 in which the arcuate reinforcing plates each have an arc about a center which intersects the central portion of the leaf spring assembly.

3. A vehicle suspension system according to claim 1 in which the bushing is at the elevation of the frame rail and the first and second end portions of the leaf spring assembly are each positioned to overhang the outer end portion of a respective one of the axles.

4. A vehicle suspension system according to claim 1 in which the central portions of the leaf spring assembly has upper and lower surfaces, and wherein the clamp comprises an upper clamp element having a first elongated leaf spring clamping surface positioned to apply a clamping force to at least one elongated section of an upper surface of the central portion of the leaf spring assembly, the clamp including a lower clamp element having a second elongated leaf spring clamping surface positioned to apply a clamping force to at least one elongated section of a lower surface of the central portion of the leaf spring assembly, and at least one fastener coupling the first and second clamp elements together such that the first and second clamp elements rigidly clamp the central portion of the leaf spring assembly.

5. A vehicle suspension system according to claim 4 in which the at least one fastener comprises first and second inverted U-bolts each having a base and first and second legs projecting from the base, the base of each of the U-bolts being positioned in a respective one of a pair of spaced-apart transversely extending recesses in the upper clamp element, the respective legs of each U-bolt extending downwardly along the opposite sides of the leaf spring assembly and through respective leg receiving apertures in the lower clamping element.

6. A vehicle suspension system according to claim 5 wherein a lower of the at least three arcuate plates is mounted to the upper clamp element and captures the bases of the U-bolts in the recesses.

7. A vehicle suspension system according to claim 1 including a bushing mounting bracket coupled to the bushing and mounted to the frame rail to couple the bushing to the frame rail, the bushing mounting bracket including a rod supporting portion extending downwardly below the bushing and outwardly at a location below the leaf spring assembly, the suspension system including first and second rods, the first rod extending from the rod supporting portion of the bushing mounting bracket to the first leaf spring mount at the outer end portion of the first axle and the second rod extending from the rod supporting portion of the mounting bracket to the second leaf spring mount at the outer end portion of the second axle.

8. A vehicle suspension system according to claim 7 including a stop mounted to the rod supporting portion and projecting upwardly toward the underside of the leaf spring assembly, the stop being positioned at a location spaced from the underside of the leaf spring assembly during normal loading of the vehicle suspension system.

9. A vehicle suspension system according to claim 7 in which the frame rail comprises an upright web portion with an outer rail surface and respective upper and lower spaced-apart flange portions projecting inwardly from the web portion, the bushing mounting bracket comprising a body having an upper wall portion with an inner surface positioned adjacent to the outer rail surface for coupling thereto to mount the bushing mounting bracket to the frame rail, an arcuate bushing engaging portion projecting outwardly from the wall portion and positioned for coupling to an upper one of the at least three arcuate reinforcing plates of the bushing, and a shelf portion positioned to lie beneath the lower flange portion of the rail, and the shelf portion having an upwardly projecting lip spaced from the inner surface of the wall portion such that the lower flange portion of the rail is positioned adjacent to the shelf portion and between the lip and the inner surface of the wall portion.

10. A vehicle suspension system according to claim 9 wherein the rod supporting portion is spaced apart from and positioned below the arcuate bushing engaging portion, the rod supporting portion including first and second downwardly projecting legs separated from one another by a void positioned therebetween, the first and second rods each being mounted to the first and second legs with the void providing clearance for the rods.

11. A vehicle suspension system according to claim 1 wherein each of the first and second leaf spring mounts comprises an upper spring clamp member having first and second spaced-apart upwardly extending spring retaining arms which define a spring receiving channel therebetween, the spring receiving channel extending through the upper spring clamp member in a direction generally parallel to the frame rail, a lower shear pad positioned between the first and second spring retaining arms, the lower shear pad having a lower base, a lower spring receiving channel spaced from and positioned above the base, and elastomeric material disposed between the lower spring receiving channel and the lower base, an upper shear pad having an upper cap mounted to the spring retaining arms, the upper shear pad having an upper spring receiving channel spaced from and positioned below the upper cap and elastomeric material disposed between the upper cap and the upper spring receiving channel, an end portion of the leaf spring assembly being received between the upper and lower spring receiving channels.

12. A vehicle suspension system according to claim 11 in which the upper spring clamp member includes a forwardly projecting first shoulder and a rearwardly projecting second shoulder, the leaf spring mount also including a lower spring clamp member positioned below the associated axle, and first and second spring clamping U-bolts, each such spring clamping U-bolt having a base and first and second legs projecting from the base, the base of each such spring clamping U-bolts being coupled to a respective one of the shoulders and the legs of the spring clamping U-bolts each extending through a respective opening through the lower clamping element.

13. A vehicle suspension system according to claim 1 in which the leaf spring assembly comprises at least two leaf springs, each having first and second end portions, the leaf springs being stacked one above the other when installed, the first end portion of at least one of the leaf springs being turned to extend into engagement with an end portion of the other of the leaf springs.

14. A vehicle suspension system according to claim 13 in which the lower one of the leaf springs has an end portion which is upwardly turned and in which the upper of the leaf springs is provided with an opening or notch into which the upwardly turned end of the lower leaf spring extends.

15. A vehicle suspension according to claim 1 in which the leaf spring is of metal.

16. A vehicle suspension according to claim 1 in which the leaf spring is of spring steel.

17. A vehicle suspension for coupling an elongated frame rail to first and second axles, the axles extending in a direction transverse to the frame rail and each having an outer end portion projecting outwardly beyond the frame rail, the vehicle suspension comprising:

a leaf spring assembly having first and second end portions and a central portion between the end portions, the leaf spring assembly extending from the outer end portion of the first axle to the outer end portion of the second axle;

a bushing coupled to the frame rail, the bushing including at least three arcuate reinforcing plates with elastomeric material disposed between the plates;

a clamp coupling the central portion of the leaf spring assembly to the bushing such that the central portion of the leaf spring is coupled to the frame rail through the bushing;

a first leaf spring mount coupling the first end portion of the leaf spring assembly to the outer end portion of the first axle and a second leaf spring mounting bracket coupling the second end portion of the leaf spring assembly to the outer end portion of the second axle;

in which the arcuate reinforcing plates each have an arc about a center which intersects the central portion of the leaf spring assembly;

in which the central portions of the leaf spring assembly has upper and lower surfaces, and wherein the clamp comprises an upper clamp element having a first elongated leaf spring clamping surface positioned to apply a clamping force to at least one elongated section of an upper surface of the central portion of the leaf spring assembly, the clamp including a lower clamp element having a second elongated leaf spring clamping surface positioned to apply a clamping force to at least one elongated section of a lower surface of the central portion of the leaf spring assembly, and at least one fastener coupling the first and second clamp elements together such that the first and second clamp elements rigidly clamp the central portion of the leaf spring assembly;

in which the at least one fastener comprises first and second inverted U-bolts each having a base and first and second legs projecting from the base, the base of each of the U-bolts being positioned in a respective one of a pair of spaced-apart transversely extending recesses in the upper clamp element, the respective legs of each U-bolt extending downwardly along the opposite sides of the leaf spring assembly and through respective leg receiving apertures in the lower clamping element;

wherein a lower of the at least three arcuate plates is mounted to the upper clamp element and captures the bases of the U-bolts in the recesses;

including a bushing mounting bracket coupled to the bushing and mounted to the frame rail to couple the bushing to the frame rail, the bushing mounting bracket including a rod supporting portion extending downwardly below the bushing and outwardly at a location below the leaf spring assembly, the suspension system including first and second rods, the first rod extending from the rod supporting portion of the bushing mounting bracket to the first leaf spring mount at the outer end portion of the first axle and the second rod extending from the rod supporting portion of the mounting bracket to the second leaf spring mount at the outer end portion of the second axle;

including a stop mounted to the rod supporting portion and projecting upwardly toward the underside of the leaf spring assembly, the stop being positioned at a location spaced from the underside of the leaf spring assembly during normal loading of the vehicle suspension system;

in which the frame rail comprises an upright web portion with an outer rail surface and respective upper and lower spaced-apart flange portions projecting inwardly from the web portion, the bushing mounting bracket comprising a body having an upper wall portion with an inner surface positioned adjacent to the outer rail surface for coupling thereto to mount the bushing mounting bracket to the frame rail, an arcuate bushing engaging portion projecting outwardly from the wall portion and positioned for coupling to an upper one of the at least three arcuate reinforcing plates of the bushing, and a shelf portion positioned to lie beneath the lower flange portion of the rail, and the shelf portion having an upwardly projecting lip spaced from the inner surface of the wall portion such that the lower flange portion of the rail is positioned adjacent to the shelf portion and between the lip and the inner surface of the wall portion;

wherein the rod supporting portion is spaced apart from and positioned below the arcuate bushing engaging portion, the rod supporting portion including first and second downwardly projecting legs separated from one another by a void positioned therebetween, the first and second rods each being mounted to the first and second legs with the void providing clearance for the rods;

wherein each of the first and second leaf spring mounts comprises an upper spring clamp member having first and second spaced-apart upwardly extending spring retaining arms which define a spring receiving channel therebetween, the spring receiving channel extending through the upper spring clamp member in a direction generally parallel to the frame rail, a lower shear pad positioned between the first and second spring retaining arms, the lower shear pad having a lower base, a lower spring receiving channel spaced from and positioned above the base, and elastomeric material disposed between the lower spring receiving channel and the lower base, an upper shear pad having an upper cap mounted to the spring retaining arms, the upper shear pad having an upper spring receiving channel spaced from and positioned below the upper cap and elastomeric material disposed between the upper cap and the upper spring receiving channel, an end portion of the leaf spring being received between the upper and lower spring receiving channels;

in which the upper spring clamp member includes a forwardly projecting first shoulder and a rearwardly projecting second shoulder, the leaf spring mount also including a lower spring clamp member positioned below the associated axle, and first and second spring clamping U-bolts, each such spring clamping U-bolt having a base and first and second legs projecting from the base, the base of each such spring clamping U-bolts being coupled to a respective one of the shoulders and the legs of the spring clamping U-bolts each extending through a respective opening through the lower clamping element;

in which the leaf spring assembly comprises at least two leaf springs, each having first and second end portions, stacked one above the other when installed, the first end portion of the lower leaf spring being narrowed in width and upwardly turned, the leaf spring above the lower leaf spring having an opening through which the upwardly turned portion of the lower leaf spring extends; and in which the opening through the upper leaf spring comprises a notch extending inwardly from the end of the leaf spring through which the upwardly turned portion of the lower leaf spring extends.

18. A bushing mounting bracket for a vehicle suspension system in which the mounting bracket is adapted to couple a bushing to a frame rail, the frame rail having a web with an upright outer surface and upper and lower spaced-apart flanges projecting inwardly from the web, the bushing having at least three arcuate reinforcing plates with elastomeric material disposed between the plates, the bushing mounting bracket comprising:

a body having an upper portion and a rod supporting portion extending downwardly from the upper portion below the bushing and outwardly at a location spaced below the bushing, the upper portion of the body comprising an upper wall portion with an inner surface positioned adjacent to the outer rail surface for coupling thereto to mount the bushing mounting bracket to the frame rail, an arcuate bushing engaging portion projecting outwardly from the wall portion and positioned for coupling to an upper one of the at least three arcuate reinforcing plates of the bushing, and a shelf portion positioned to lie beneath the lower flange portion of the rail, the shelf portion having an upwardly projecting lip spaced from the inner surface of the wall portion such that the lower flange portion of the rail is positioned adjacent to the shelf portion and between the lip and the inner surface of the wall portion; and wherein the rod supporting portion is spaced apart from and below the arcuate bushing engaging portion, the rod supporting portion including first and second downwardly projecting legs separated from one another by a void positioned therebetween.

19. A leaf spring mount for a vehicle suspension system, the vehicle suspension system being of the type which couples an elongated frame rail to first and second axles, the axles extending in a direction transverse to the frame rail and having outer end portions, the leaf spring mount being adapted to couple an end portion of a leaf spring assembly to an outer end portion of one of the first and second axles, the leaf spring mount comprising:

an upper spring clamp member having first and second spaced-apart upwardly extending spring retaining arms which define a spring receiving channel therebetween, the spring receiving channel extending through the upper spring clamp member in a direction generally parallel to the frame rail, a lower shear pad positioned between the first and second spring retaining arms, the lower shear pad having a lower base, a lower spring receiving channel spaced from and positioned above the base, and elastomeric material disposed between the lower spring receiving channel and the lower base, an upper shear pad having an upper cap mounted to the spring retaining arms, the upper shear pad having an upper spring receiving channel spaced from and positioned below the upper cap and elastomeric material disposed between the upper cap and the upper spring receiving channel, an end portion of the leaf spring being received between the upper and lower spring receiving channels; and in which the upper spring clamp member includes a forwardly projecting first shoulder and a rearwardly projecting second shoulder, the spring mount including a lower spring clamp member positioned below the associated axle, and first and second spring clamping U-bolts, each spring clamping U-bolt having a base and first and second legs projecting from the base, the base of each such spring clamping U-bolts being coupled to a respective one of the shoulders and the legs of the spring clamping U-bolts and each extending through a respective opening through the lower clamping element.

20. A leaf spring assembly for a vehicle suspension system comprising at least two leaf springs stacked one above the other when installed, each of the leaf springs having first and second end portions, the first end portion of one of the leaf springs being turned toward and extending into engagement with the first end portions of the other of the leaf springs to couple the first end portions together to resist splaying of the leaf springs.

21. A leaf spring assembly according to claim 20, and wherein the opening through the upper leaf springs comprise a notch extending inwardly from the end of the leaf spring through which the upwardly turned portion of the lower leaf spring extends.

22. A vehicle suspension for coupling an elongated frame rail to first and second axles, the axles extending in a direction transverse to the frame rail and having outer end portions projecting outwardly beyond the frame rail, the vehicle suspension comprising:

a leaf spring assembly having first and second end portions, the leaf spring assembly extending from the outer end portion of the first axle to the outer end portion of the second axle;

bushing means mounted to the frame rail for resiliently coupling the leaf spring assembly to the frame rail so as to permit upward and downward movement of the respective ends of the leaf spring assembly relative to one another;

clamp means for coupling the central portion of the leaf spring assembly to the bushing means for suspending the leaf spring assembly from the frame rail by the bushing means; and first mounting means for coupling the first end portion of the leaf spring assembly to the outer end portion of the first axle and second mounting means for coupling the second end portion of the leaf spring assembly to the outer end portion of the first axle.

23. A method of suspending first and second axles from an elongated frame rail, the axles extending in a direction transverse to the frame rail and having respective outer end portions extending outwardly beyond the frame rail, the method comprising:

mounting an elongated leaf spring assembly to the frame rail for movement about a pivot axis that extends through the leaf spring assembly, the leaf spring assembly comprising at least one leaf spring, the pivot axis being positioned below the frame rail; and coupling the respective end portions of the at least one leaf spring to respective axles with the at least one leaf spring extending continuously from a location adjacent to one of the axles to a location adjacent to another of the axles, while allowing movement in shear between the axles and the at least one leaf spring and without pivoting the at least one leaf spring to the axles using a ball joint; and wherein the step of mounting the leaf spring assembly comprises the step of clamping a central section of the leaf spring assembly to a bushing which includes a plurality of arcuate reinforcing plates with elastomeric material between the plates, the plates having a common center point which coincides with the central section of the leaf spring assembly.

24. A method of suspending first and second axles from an elongated frame rail, the axles extending in a direction transverse to the frame rail and having respective outer end portions extending outwardly beyond the frame rail, the method comprising:

mounting an elongated leaf spring assembly to the frame rail for movement about a pivot axis that extends through the leaf spring assembly, the leaf spring assembly comprising at least one leaf spring, the pivot axis being positioned below the frame rail; and coupling the respective end portions of the at least one leaf spring to respective axles with the at least one leaf spring extending continuously from a location adjacent to one of the axles to a location adjacent to another of the axles, while allowing movement in shear between the axles and the at least one leaf spring and without pivoting the leaf spring to the axles using a ball joint; and wherein the coupling act comprises coupling the respective end portions of the at least one leaf spring in a manner that permits motion of a coupler in shear both above and below the coupled leaf spring.

25. A vehicle suspension for coupling an elongated frame rail to first and second axles, the axles extending in a direction transverse to the frame rail and each having an outer end portion projecting outwardly beyond the frame rail, the vehicle suspension comprising:

a leaf spring assembly having first and second end portions and a central portion between the end portions, the leaf spring assembly extending from the outer end portion of the first axle to the outer end portion of the second axle;

a bushing coupled to the frame rail, the bushing including at least three arcuate reinforcing plates with elastomeric material disposed between the plates;

a clamp coupling the central portion of the leaf spring assembly to the bushing such that the central portion of the leaf spring is coupled to the frame rail through the bushing; and a first leaf spring mount coupling the first end portion of the leaf spring assembly to the outer end portion of the first axle and a second leaf spring mount coupling the second end portion of the leaf spring assembly to the outer end portion of the second axle, the first and second leaf spring mounts including shear elements positioned above and below the coupled end portion of the leaf spring and which move in shear relative to the axles and leaf spring assembly as the axles articulate relative to one another; and including a stop mounted to the rod supporting portion and projecting upwardly toward the underside of the leaf spring assembly, the stop being positioned at a location spaced from the underside of the leaf spring assembly during normal loading of the vehicle suspension system.

* * * * *

UNITED STATES PATENT AND TRADEMARK OFFICE
CERTIFICATE OF CORRECTION

PATENT NO. : 6,206,407 B1
DATED : March 27, 2001
INVENTOR(S) : Fuchs et al.

It is certified that error appears in the above-identified patent and that said Letters Patent is hereby corrected as shown below:

Column 7,
Line 58, the number "170" should be -- 171 --
Line 61, the numbers "162, 164;" should read -- 160, 162; --

Column 8,
Line 35, the number "162," should be -- 162 and 152 --

Signed and Sealed this

Seventh Day of May, 2002

Attest:

Attesting Officer

JAMES E. ROGAN
Director of the United States Patent and Trademark Office